(12) United States Patent
Shimoda et al.

(10) Patent No.: US 6,826,924 B2
(45) Date of Patent: Dec. 7, 2004

(54) HEAT PUMP APPARATUS

(75) Inventors: Junichi Shimoda, Osaka (JP); Hiromune Matsuoka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/388,443

(22) Filed: Mar. 17, 2003

(65) Prior Publication Data

US 2004/0182101 A1 Sep. 23, 2004

(51) Int. Cl.[7] ............................................. F25B 13/00
(52) U.S. Cl. ....................... 62/324.4; 62/324.1; 62/160
(58) Field of Search .............................. 62/160, 324.1, 62/324.4, 324.6, 149

(56) References Cited

U.S. PATENT DOCUMENTS

| | | | | |
|---|---|---|---|---|
| 3,074,249 A | * | 1/1963 | Henderson | 62/149 |
| 3,077,087 A | * | 2/1963 | Japhet | 62/324.1 |
| 3,091,944 A | * | 6/1963 | Miner et al. | 62/159 |
| 4,259,848 A | * | 4/1981 | Voigt | 62/113 |
| 4,620,423 A | * | 11/1986 | Hopkinson et al. | 62/77 |
| 5,249,432 A | * | 10/1993 | Ichikawa | 62/197 |
| 5,379,606 A | * | 1/1995 | Katsuki et al. | 62/126 |
| 5,653,120 A | * | 8/1997 | Meyer | 62/324.4 |
| 6,343,482 B1 | * | 2/2002 | Endo et al. | 62/324.6 |

FOREIGN PATENT DOCUMENTS

JP          10-300292          11/1998

OTHER PUBLICATIONS

Patent Abstracts of Japan 2002–147878, Daikin Ind. LTD., May 22, 2002.*

* cited by examiner

*Primary Examiner*—William C. Doerrler
(74) *Attorney, Agent, or Firm*—Donald R. Studebaker; Nixon Peabody, LLP

(57) ABSTRACT

Indoor circuits (60, 65) of indoor units (12, 13) are each connected in parallel to an outdoor circuit (20) of an outdoor unit (11). The outdoor circuit (20) has a gas vent pipe (35) by which a receiver (23) is brought into communication with suction sides of compressors (41, 42). During the heating operation in the heating mode of operation, a gas vent solenoid valve (36) is placed in the open state so that the receiver (23) decreases in pressure. This relaxes restrictions on the difference in installation height between each indoor unit of a multi type airconditioner having a plurality of indoor units.

4 Claims, 3 Drawing Sheets

HEAT PUMP APPARATUS

TECHNICAL FIELD OF INVENTION

The present invention relates to a heat pump apparatus which performs a refrigeration cycle.

BACKGROUND OF INVENTION

Airconditioners of the so-called multi type have been known in the prior art. Japanese Patent Kokai Gazette No. (1998)300292 discloses one such airconditioner that includes a single outdoor unit and a plurality of indoor units connected to the outdoor unit. In this airconditioner, the outdoor unit contains an outdoor circuit and each indoor unit contains an indoor circuit. The outdoor circuit of the outdoor unit includes a compressor, an outdoor heat exchanger, an outdoor expansion valve, a receiver, et cetera. On the other hand, the indoor circuit of each indoor unit includes an indoor heat exchanger and an indoor expansion valve. The indoor units are each connected in parallel to the outdoor unit to form a refrigerant circuit of the airconditioner.

The above-described airconditioner performs a refrigeration cycle by circulation of a refrigerant through the refrigerant circuit. Additionally, the airconditioner operates switchably between a cooling mode of operation and a heating mode of operation by reversing the circulation direction of refrigerant in the refrigerant circuit.

During the cooling mode of operation, a cooling operation, in which each indoor heat exchanger acts as an evaporator, is carried out. During the cooling mode of operation, a refrigerant discharged from the compressor is caused to condense by the outdoor heat exchanger. After passing through the receiver, the refrigerant is distributed to each indoor circuit. Thereafter, the refrigerant is depressurized by the indoor expansion valve, is caused to evaporate by the indoor heat exchanger, is brought back to the outdoor circuit, and is drawn into the compressor.

During the heating mode of operation, a heating operation (i.e., a heat pump operation), in which each indoor heat exchanger acts as a condenser, is carried out. During the heating mode of operation, a refrigerant discharged from the compressor is distributed to each indoor circuit and is caused to condense by the indoor heat exchanger. The refrigerant condensed is depressurized by the indoor expansion valve. Thereafter, the refrigerant is delivered to the outdoor circuit. And, after passing through the receiver, the refrigerant is further depressurized by the outdoor expansion valve. Thereafter, the refrigerant is caused to evaporate by the outdoor heat exchanger and is drawn into the compressor.

Installation of a multi type airconditioner in a building may result in a difference in installation height between indoor units. For example, when an outdoor unit is installed on the roof and indoor units are installed on the first floor and on the second floor, respectively, there is a difference in installation height between the indoor units. In this case, the refrigerant, while changing in phase, circulates between an outdoor circuit contained in the outdoor unit installed on the roof and each of indoor circuits contained in the indoor units installed on the first and second floors.

However, if the difference in installation height between the indoor units becomes greater, this causes the problem that the refrigerant flows only through the upper-situated indoor unit, in other words no refrigerant flows in the lower-situated indoor unit during the heating mode of operation of the airconditioner. As a result, the lower-situated indoor unit fails to provide sufficient heating. Consequently, conventional airconditioners are subject to many restrictions on the difference in installation height between indoor units and the degree of layout freedom at the time of installation in a building is little.

Referring to FIG. 4, such a drawback will be illustrated by an example case in which a first indoor unit (12) is installed lower than an outdoor unit (11) and a second indoor unit (13) is disposed lower than the first indoor unit (12). Here, the description will be made on the condition that there is an installation height difference of $H_1$ between the second indoor unit (13) and the first indoor unit (12) and there is an installation height difference of $H_2$ between the first indoor unit (12) and the outdoor unit (11) is (see FIG. 2).

FIG. 4 is a Mollier diagram (i.e., a pressure-enthalpy diagram) showing a typical refrigeration cycle performed in the refrigerant circuit of the airconditioner. During the heating mode of operation, a refrigerant condensed by an indoor heat exchanger of the first indoor unit (12) is depressurized by an indoor expansion valve of the first indoor unit (12) and, as a result, the pressure decreases by $\Delta P_{i1}$. On the other hand, a refrigerant condensed by an indoor heat exchanger of the second indoor unit (13) is depressurized by an indoor expansion valve of the second indoor unit (13) and, as a result, the refrigerant pressure decreases by $\Delta P_{i2}$. The refrigerant condensed in the second indoor unit (13) flows toward the outdoor unit (11) and the refrigerant pressure will have decreased by a liquid head difference $\Delta_{h1}$ corresponding to the installation height difference $H_1$ between the first indoor unit (12) and the second indoor unit (13) at the moment that the refrigerant reaches the height of the first indoor unit (12). Thereafter, the refrigerant from the first indoor unit and the refrigerant from the second indoor unit flow into each other and the refrigerant pressure decreases by a liquid head difference $\Delta_{h2}$ corresponding to the installation height difference $H_2$ between the first indoor unit (12) and the outdoor unit (11). And, the refrigerant flows into the receiver. The refrigerant, which has exited the receiver, is depressurized by the outdoor expansion valve and the refrigerant pressure decreases by $\Delta P_0$. Then the refrigerant is caused to evaporate by the outdoor heat exchanger and is drawn into the compressor.

If the installation height difference $H_1$ between the indoor units (12, 13) is increased, then the liquid head difference $\Delta_{h1}$ corresponding to the installation height difference $H_1$ also increases. In this case, the valve travel of the indoor expansion valve (which has already been in a certain open state) of the second indoor unit (13) is increased to a further extent so as to reduce the differential pressure $\Delta P_{i2}$ between the inlet pressure and the outlet pressure of the indoor expansion valve, whereby the flow rate of refrigerant to the second indoor unit (13) is assured. However, even when the indoor expansion valve of the second indoor unit (13) is fully opened, it is impossible to reduce the differential pressure $\Delta P_{i2}$ to zero. Accordingly, if the installation height difference $H_1$ between the indoor units (12, 13) becomes excessive, this makes it impossible to assure the flow rate of refrigerant to the second indoor unit (13) by adjustment of the valve travel of the indoor expansion valve of the second indoor unit (13). As a result, the flow rate of refrigerant to the second indoor unit (13) decreases. Therefore, severe restrictions have been imposed on the indoor unit installation height difference $H_1$ in order to prevent occurrence of such a situation.

In consideration of the above-described inconvenience, the present invention was made. Accordingly, an object of the present invention is to relax restrictions on the installation of a heat pump apparatus including a plurality of utilization side circuits, thereby improving the freedom of installation thereof.

SUMMARY OF INVENTION

The present invention discloses a heat pump apparatus comprising a refrigerant circuit (15) in which a plurality of utilization side circuits (60, 65) having respective utilization side heat exchangers (61, 66) and utilization side expansion mechanisms (62, 67) are each connected in parallel to a heat source side circuit (20) having a compressor (41, 42), a heat source side expansion mechanism (24), and a receiver (23), and the heat pump apparatus performs at least a heating operation for allowing refrigerant, condensed by each of the utilization side heat exchangers (61, 66) in a refrigeration cycle in which refrigerant circulates in the refrigerant circuit (15), to flow into the receiver (23). And, the heat pump apparatus further comprises a communicating passageway (35) for directing gaseous refrigerant in the receiver (23) to a suction side of the compressor (41, 42), a switching mechanism (36) for establishing and interrupting flow of gaseous refrigerant in the communicating passageway (35), and a controlling means (90) for controlling the switching mechanism (36) so that gaseous refrigerant flows in the communicating passageway (35) in the heating operation.

In the refrigerant circuit (15) of the present heat pump apparatus, the utilization side circuits (60, 65) are each connected in parallel to the heat source side circuit (20). The heat source side circuit (20) includes the compressor (41, 42), the heat source side heat exchanger (22), the heat source side expansion mechanism (24), and the receiver (23). The utilization side circuit (60) includes the utilization side heat exchanger (61) and the utilization side expansion mechanism (62). The utilization side circuit (65) include the utilization side heat exchanger (66) and the utilization side expansion mechanism (67).

The heat pump apparatus performs a heating operation. At the time of performing a heating operation, the refrigerant, while changing in phase, circulates in the refrigerant circuit (15), whereby refrigeration cycles are performed. During the heating operation, refrigerant discharged from the compressor (41, 42) is delivered to the utilization side heat exchanger (61, 66) and is caused to condense by liberation of heat to objects. By virtue of such heat liberation, the objects are heated. The refrigerant condensed by the utilization side heat exchanger (61, 66) flows through the utilization side expansion mechanism (62, 67) and then flows into the receiver (23) of the heat source side circuit (20). Thereafter, the refrigerant in the receiver (23) flows through the heat source side expansion mechanism (24) and is caused to evaporate by heat absorption in the heat source side heat exchanger (22). Thereafter, the refrigerant is drawn into the compressor (41, 42). In this way, the refrigerant circulates in the refrigerant circuit (15).

The heat pump apparatus is provided with the communicating passageway (35) and the switching mechanism (36). The switching mechanism (36) is a mechanism capable of establishing and interrupting flow of gaseous refrigerant in the communicating passageway (35). When the switching mechanism (36) is open, gaseous refrigerant becomes circulatable in the communicating passageway (35), and gaseous refrigerant in the receiver (23) is delivered to the suction side of the compressor (41, 42). In other words, the compressor (41, 42) sucks in gaseous refrigerant from the receiver (23) and, as a result, the pressure of the receiver (23) decreases. On the other hand, when the switching mechanism (36) is closed, circulation of gaseous refrigerant in the communicating passageway (35) is prevented.

Further, the heat pump apparatus is provided with the controlling means (90). The controlling means (90) controls the switching mechanism (36) in the heating operation so that gaseous refrigerant in the receiver (23) is delivered, through the communicating passageway (35), to the compressor (41, 42). The controlling means (90) may be implemented by a controlling means which controls the switching mechanism (36) so that gaseous refrigerant in the receiver (23) is constantly delivered to the compressor (41, 42) for example during the heating operation. Alternatively, the controlling means (90) may be implemented by a controlling means which controls the switching mechanism (36) so that gaseous refrigerant in the receiver (23) is delivered to the compressor (41, 42) only when predetermined conditions are met during the heating operation.

Further, in the heat pump apparatus of the present invention, preferably the heat source side circuit (20) is connected, through interconnecting lines (16, 17), to the utilization side circuits (60, 65) disposed lower than the heat source side circuit (20), and at least one of the utilization side circuits (60, 65) is disposed at a different height from that of the other utilization side circuit (60).

In this heat pump apparatus, the heat source side circuit (20) is connected to the utilization side circuits (60, 65) by the interconnecting lines (16, 17). Stated another way, the heat source side circuit (20), the utilization side circuits (60, 65), and the interconnecting lines (16, 17) together constitute the refrigerant circuit (15) which is a closed circuit.

In the refrigerant circuit (15), the utilization side circuits (60, 65) are disposed lower than the heat source side circuit (20). Additionally, the utilization side circuits (60, 65) are installed at different heights, for example when the number of utilization side circuits is three and the three utilization side circuits are installed on the first floor, on the second floor, and on the third floor, respectively, or two of the three utilization side circuits are installed on the second floor and the remaining utilization side circuit is installed on the first floor.

Further, in the heat pump apparatus of the present invention, preferably the controlling means (90) controls the switching mechanism (36) so that gaseous refrigerant constantly flows through the communicating passageway (35) during the heating operation.

In this heat pump apparatus, the controlling means (90) controls the switching mechanism (36) so that gaseous refrigerant in the receiver (23) is constantly delivered, through the communicating passageway (35), to the compressor (41, 42) during the heating operation. In other words, gaseous refrigerant in the receiver (23) is drawn into the compressor (41, 42) during the heating operation, thereby constantly holding the pressure of the receiver (23) at low level.

In accordance with the present invention, gaseous refrigerant is withdrawn from the receiver (23) in the heating operation, whereby the pressure of the receiver (23) is reduced. Stated another way, it is possible to gain, in the heating operation, a sufficient pressure difference between the inflow side of the heat source side circuit (20) and the outflow side of each of the utilization side circuits (60, 65), thereby ensuring that refrigerant condensed by each of the utilization side heat exchangers (61, 66) is delivered to the receiver (23).

As a result of such arrangement, even when the utilization side circuits (60, 65) are installed at different heights thereby producing a difference in installation height between the utilization side circuits (60, 65), it is ensured that refrigerant condensed by each of the utilization side heat exchangers (61, 66) flows into the receiver (23). Therefore it is possible to secure a sufficient flow rate of the refrigerant in each of the utilization side circuits (60, 65). Accordingly, in accordance with the present invention, it is possible to relax restrictions on the difference in installation height between the utilization side circuits (60, 65) at the time of installation of the heat pump apparatus, thereby improving the freedom of installation thereof.

Further, the present invention provides the following effects. These effects will be described below.

Liquid refrigerant and gaseous refrigerant coexist in the inside of the receiver (23). When the gaseous refrigerant is pumped out of the receiver (23) and, as a result, the pressure of the receiver (23) decreases, a part of the liquid refrigerant held in the receiver (23) is caused to evaporate, thereby robbing evaporation heat from the remaining liquid refrigerant. Consequently, the specific enthalpy of the liquid refrigerant held in the receiver (23) decreases. In other words, the specific enthalpy of the liquid refrigerant that is delivered from the receiver (23) to the heat source side heat exchanger (22) serving as an evaporator drops. Accordingly, it is possible to gain, by just that much, an enthalpy difference between the inlet and the outlet of the heat source side heat exchanger (22). As a result, it is possible to increase the refrigerant evaporation pressure in the heat source side heat exchanger (22) while securing the refrigerant heat absorption amount in the heat source side heat exchanger (22). As a result of this, the compression ratio of the compressor (41, 42) is reduced while maintaining the amount of heat liberation in the utilization side heat exchangers (61, 66), and it becomes possible to improve the COP (coefficient of performance) of heat pump apparatus.

DESCRIPTION OF BEST MODE FOR CARRYING OUT INVENTION

Hereinafter, an embodiment of the present invention will be described in detail with reference to the drawings. This embodiment is an airconditioner (10) which constitutes a heat pump apparatus according to the present invention. The airconditioner (10) operates switchably between a cooling operation and a heating operation.

Figure 1:
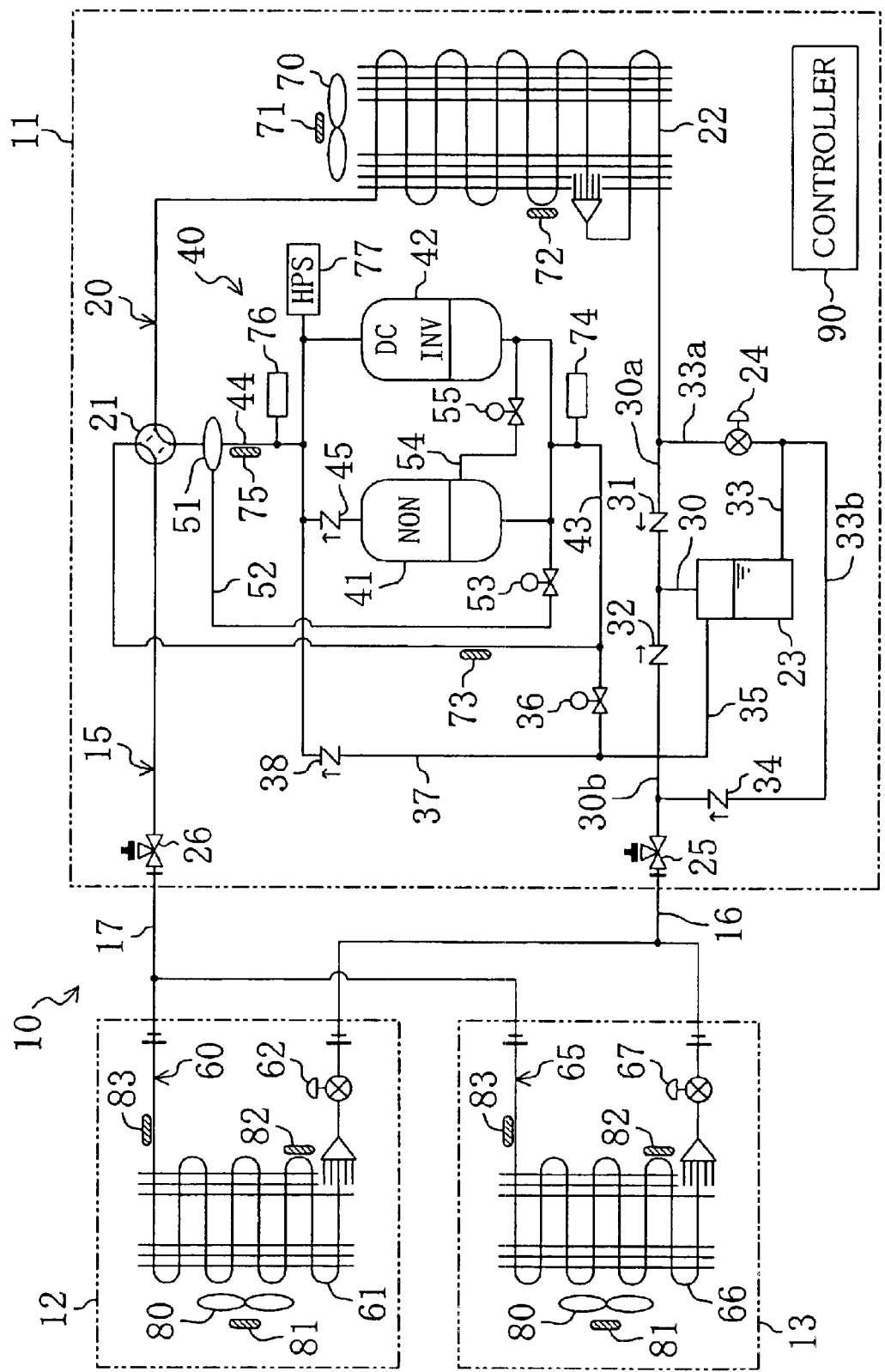
FIG. 1 is a piping system diagram of a refrigerant circuit in an airconditioner according to an embodiment of the present invention.

As shown in FIG. 1, the airconditioner (10) is made up of a single outdoor unit (11) and two indoor units (12, 13), in other words the airconditioner (10) is a so-called multi type airconditioner. Further, the airconditioner (10) includes a refrigerant circuit (15) and a controller (90). In addition, the number of indoor units (12, 13) is two in the present embodiment, which is, however, illustrative only. The number of indoor units (12, 13) may be determined appropriately according to the capacity and the application of the outdoor unit (11).

The refrigerant circuit (15) is made up of a single outdoor circuit (20), two indoor circuits (60, 65), a liquid side interconnecting pipe (16), and a gas side interconnecting pipe (17). The two indoor circuits (60, 65) are connected in parallel to the outdoor circuit (20) through the liquid side interconnecting pipe (16) and through the gas side interconnecting pipe (17), respectively. The liquid side interconnecting pipe (16) and the gas side interconnecting pipe (17) constitute interconnecting piping.

The outdoor circuit (20) is contained in the outdoor unit (11). The outdoor circuit (20) constitutes a heat source side circuit. The outdoor circuit (20) includes a compressor unit (40), a four-way selector valve (21), an outdoor heat exchanger (22), an outdoor expansion valve (24), a receiver (23), a liquid side closing valve (25), and a gas side closing valve (26).

The compressor unit (40) is made up of a first compressor (41) and a second compressor (42) which are connected in parallel. Both the compressors (41, 42) are hermetic type scroll compressors. In other words, these compressors (41, 42) each comprise a cylinder-shaped housing in which are contained a compression mechanism and an electric motor for driving the compression mechanism. Diagramatic representation of the compression mechanisms and electric motors of the compressors (41, 42) is omitted. In the first compressor (41) which is a fixed displacement compressor, its electric motor is driven at a fixed number of revolutions. On the other hand, in the second compressor (42) which is a variable displacement compressor, the number of revolutions of its electric motor is changed gradually or continuously. And, the total displacement of the compressor unit (40) varies according to the start/stop of the first compressor (41) and according to the change in displacement of the second compressor (42).

The compressor unit (40) includes a suction pipe (43) and a discharge pipe (44). An inlet end of the suction pipe (43) is connected to a first port of the four-way selector valve (21). An outlet end of the suction pipe (43) is divided into two branch pipes and these two branch pipes are connected to a suction side of the compressor (41) and to a suction side of the compressor (42), respectively. An inlet end of the discharge pipe (44) is divided into two branch pipes and these two branch pipes are connected to a discharge side of the compressor (41) and to a discharge side of the compressor (42), respectively. An outlet end of the discharge pipe (44) is connected to a second port of the four-way selector valve (21). Additionally, the branch pipe of the discharge pipe (44) connected to the first compressor (41) includes a discharge side check valve (45). The discharge side check valve (45) permits only the flow of a refrigerant flowing out of the first compressor (41).

Furthermore, the compressor unit (40) further includes an oil separator (51), an oil return pipe (52), and an oil amount averaging pipe (54). The oil separator (51) is situated midway along the discharge pipe (44). The oil separator (51) separates refrigerating machine oil from refrigerant discharged from each of the compressors (41, 42). One end of the oil return pipe (52) is connected to the oil separator (51). The other end of the oil return pipe (52) is connected to the suction pipe (43). The oil return pipe (52) is a pipe through which refrigerating machine oil separated by the oil separator (51) is brought back to the suction sides of the compressors (41, 42). The oil return pipe (52) is provided with an oil return solenoid valve (53). One end of the oil amount averaging pipe (54) is connected to the first compressor (41). The other end of the oil amount averaging pipe (54) is connected to the suction pipe (43) in the vicinity of the suction side of the second compressor (42). The oil amount averaging pipe (54) is a pipe which averages the amount of refrigerating machine oil stored in the housings of the compressors (41, 42). The oil amount averaging pipe (54), is provided with an oil amount averaging solenoid valve (55).

A third port of the four-way selector valve (21) is connected by piping to the gas side closing valve (26). A fourth port of the four-way selector valve (21) is connected by piping to an upper end of the outdoor heat exchanger (22). The four-way selector valve (21) switches between a first state (as indicated by solid lines of FIG. 1) in which the first port communicates with the third port and at the same time the second port communicates with the fourth port and a second state (as indicated by broken lines of FIG. 1) in which the first port communicates with the fourth port and at the same time the second port communicates with the third port. By virtue of the switching operation of the four-way selector valve (21), the direction in which the refrigerant circulates in the refrigerant circuit (15) is reversed.

The receiver (23) is a container, shaped like a cylinder, for storing refrigerant. The receiver (23) is connected, through an inflow pipe (30) and an outflow pipe (33), to the outdoor heat exchanger (22) and the liquid side closing valve (25).

The inflow pipe (30) is divided, at its an inlet end side, into two branch pipes (30a, 30b). An outlet end of the inflow pipe (30) is connected to the upper end of the receiver (23). The first branch pipe (30a) of the inflow pipe (30) is connected to the lower end of the outdoor heat exchanger (22). The first branch pipe (30a) is provided with a first inflow check valve (31). The first inflow check valve (31) permits only the flow of a refrigerant flowing from the outdoor heat exchanger (22) toward the receiver (23). The second branch pipe (30b) of the inflow pipe (30) is connected to the liquid side closing valve (25). The second branch pipe (30b) is provide with a second inflow check valve (32). The second inflow check valve (32) permits only the flow of a refrigerant flowing from the liquid side closing valve (25) toward the receiver (23).

An inlet end of the outflow pipe (33) is connected to the lower end of the receiver (23). The outflow pipe (33) is divided, at its an outlet end side, into two branch pipes (33a, 33b). The first branch pipe (33a) of the outflow pipe (33) is connected to the lower end of the outdoor heat exchanger (22). The first branch pipe (33a) is provided with the outdoor expansion valve (24). The outdoor expansion valve (24) constitutes a heat source side expansion mechanism. The second branch pipe (33b) of the outflow pipe (33) is connected to the liquid side closing valve (25). The second branch pipe (33b) is provided with an outflow check valve (34). The outflow check valve (34) permits only the flow of a refrigerant flowing from the receiver (23) toward the liquid side closing valve (25).

The outdoor heat exchanger (22) constitutes a heat source side heat exchanger. The outdoor heat exchanger (22) is a fin and tube type heat exchanger of the cross fin system. In the outdoor heat exchanger (22), heat exchange occurs between the refrigerant circulating in the refrigerant circuit (15) and the outdoor air.

The outdoor circuit (20) further includes a gas vent pipe (35) and a pressure equalizing pipe (37).

One end of the gas vent pipe (35) is connected to the upper end of the receiver (23). The other end of the gas vent pipe (35) is connected to the suction pipe (43). The gas vent pipe (35) constitutes a communicating passageway for introducing gaseous refrigerant in the receiver (23) to the suction sides of the compressors (41, 42). Additionally, the gas vent pipe (35) is provided with a gas vent solenoid valve (36). The gas vent solenoid valve (36) constitutes an opening/closing mechanism for establishing and interrupting the flow of refrigerant in the gas vent pipe (35).

One end of the pressure equalizing pipe (37) is connected between the gas vent solenoid valve (36) of the gas vent pipe (35) and the receiver (23). The other end of the pressure equalizing pipe (37) is connected to the discharge pipe (44). Additionally, the pressure equalizing pipe (37) is provided with a check valve (38) for pressure equalization. The check valve (38) permits only the flow of a refrigerant flowing from one end thereof toward the other end. If the pressure of the receiver (23) increases excessively because of an abnormal increase in outdoor air temperature occurring when the airconditioner (10) is not in operation, the pressure equalizing pipe (37) relieves gaseous refrigerant to prevent bursting of the receiver (23). Accordingly, no refrigerant will flow through the pressure equalizing pipe (37) when the airconditioner (10) is in operation.

The indoor circuits (60, 65) are disposed in the indoor units (12, 13), respectively. More specifically, the first indoor unit (12) is provided with the first indoor circuit (60) and the second indoor unit (13) is provided with the second indoor circuit (65).

The first indoor circuit (60), formed by connecting the first indoor heat exchanger (61) and the first indoor expansion valve (62) in series, constitutes a utilization side circuit. The first indoor expansion valve (62), connected by piping to the lower end of the first indoor heat exchanger (61), constitutes a utilization side expansion mechanism. The second indoor circuit (65), formed by connecting the second indoor heat exchanger (66) and the second indoor expansion valve (67) in series, constitutes a utilization side circuit. The second indoor expansion valve (67), connected by piping to the lower end of the second indoor heat exchanger (66), constitutes a utilization side expansion mechanism.

The first and second indoor heat exchangers (61, 66) are utilization side heat exchangers. Each of the indoor heat exchangers (61, 66) is implemented by a fin and tube type heat exchanger of the cross fin system. Heat exchange occurs between the refrigerant circulating through the refrigerant circuit (15) and the indoor air, in each of the indoor heat exchangers (61, 66).

One end of the liquid side interconnecting pipe (16) is connected to the liquid side closing valve (25). The liquid side interconnecting pipe (16) is divided, at the other end thereof, into two branch pipes. One of these branch pipes of the liquid side interconnecting pipe (16) is connected to an end of the first indoor circuit (60) located on the side of the first indoor expansion valve (62), while the other branch pipe is connected to an end of the second indoor circuit (65) located on the side of the second indoor expansion valve (67). One end of the gas side interconnecting pipe (17) is connected to the gas side closing valve (26). The gas side interconnecting pipe (17) is divided, at the other end thereof, into two branch pipes. One of these branch pipes of the gas side interconnecting pipe (17) is connected to an end of the first indoor circuit (60) located on the side of the first indoor heat exchanger (61), while the other branch pipe is connected to an end of the second indoor circuit (65) located on the side of the second indoor heat exchanger (66).

The outdoor unit (11) is provided with an outdoor fan (70). The outdoor fan (70) supplies outdoor air to the outdoor heat exchanger (22). On the other hand, the first and second indoor units (12, 13) are provided with respective indoor fans (80). These indoor fans (80) supply indoor air to the indoor heat exchangers (61, 66).

The airconditioner (10) is provided with temperature sensors, pressure sensors, et cetera. More specifically, the outdoor unit (11) is provided with an outdoor air temperature sensor (71) for detecting the temperature of outdoor air. The outdoor heat exchanger (22) is provided with an outdoor heat exchanger temperature sensor (72) for detecting the temperature of its heat transfer tube. The suction pipe (43) is provided with a suction pipe temperature sensor (73) for detecting the suction refrigerant temperature of the compressors (41, 42) and a low-level pressure sensor (74) for detecting the suction refrigerant pressure of the compressors (41, 42). The discharge pipe (44) is provided with a discharge pipe temperature sensor (75) for detecting the discharge refrigerant temperature of the compressors (41, 42), a high-level pressure sensor (76) for detecting the discharge refrigerant pressure of the compressors (41, 42), and a high-level pressure switch (77). The indoor units (12, 13) are each provided with a respective indoor air temperature sensor (81) for detecting the temperature of indoor air. The indoor heat exchangers (61, 66) are each provided with a respective indoor heat exchanger temperature sensor (82) for detecting the temperature of its heat transfer tube. The indoor circuit (60) is provided, in the vicinity of an upper end of the indoor heat exchanger (61), with a gas side temperature sensor (83) for detecting the temperature of gaseous refrigerant flowing through the indoor circuit (60). Likewise, the indoor circuit (65) is provided, in the vicinity of an upper end of the indoor heat exchanger (66), with a gas side temperature sensor (83) for detecting the temperature of gaseous refrigerant flowing through the indoor circuit (65).

Upon receipt of signals from the sensors of the above-described types and command signals from remote controllers, the controller (90) controls the operation of the airconditioner (10). More specifically, the controller (90) controls: adjustment of the valve travel of the outdoor expansion valve (24) and the indoor expansion valves (62, 67); switching of the four-way selector valve (21); and closing/opening of the gas vent solenoid valve (36), the oil return solenoid valve (53), and the oil amount averaging solenoid valve (55). In other words, the controller (90) constitutes a control means for controlling the gas vent solenoid valve (36) serving as an opening/closing mechanism. Additionally, the controller (90) controls also the displacement of the compressor unit (40).

Figure 2:
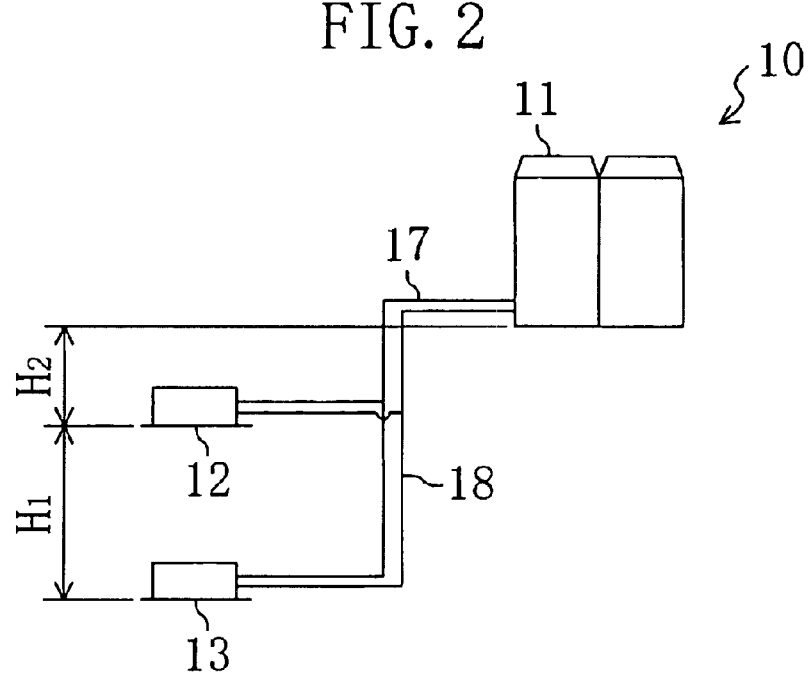
FIG. 2 is a schematic arrangement diagram showing a layout of an outdoor unit and indoor units in the airconditioner of the embodiment.

The airconditioner (10) is installed in a building. The outdoor unit (11) is placed on a roof of the building, while the two indoor units (12, 13) are placed on different floors of the building. More specifically, as shown in FIG. 2, the first indoor unit (12) is situated lower than the outdoor unit (11) by a height of $H_2$ and the second indoor unit (13) is situated lower than the first indoor unit (12) by a height of $H_1$.

Running Operation

During the operation of the airconditioner (10), refrigerant circulates in the refrigerant circuit (15) while changing in phase, whereby a vapor compression refrigeration cycle is performed. Furthermore, the airconditioner (10) operates switchably between a cooling operation and a heating operation.

Cooling Operation

In the cooling mode of operation, a cooling operation, in which the indoor heat exchangers (61, 66) serve as evaporators, is carried out. In the cooling mode of operation, the four-way selector valve (21) is placed in the state indicated by solid lines of FIG. 1. The outdoor expansion valve (24) is fully opened, and the valve travel of the first indoor expansion valve (62) and the valve travel of the second indoor expansion valve (67) are adjusted to predetermined values, respectively. The gas vent solenoid valve (36) is held in the closed state. The oil return solenoid valve (53) and the oil amount averaging solenoid valve (55) are placed in the open or closed state as required. These valve operations are carried out by the controller (90).

When the compressors (41, 42) of the compressor unit (40) are operated, refrigerant compressed by the compressors (41, 42) is discharged to the discharge pipe (44). The refrigerant passes through the four-way selector valve (21) and flows into the outdoor heat exchanger (22). In the outdoor heat exchanger (22), the refrigerant liberates heat to outdoor air and condenses. The refrigerant condensed by the outdoor heat exchanger (22) flows into the first branch pipe (30a) of the inflow pipe (30), passes through the first inflow check valve (31), and flows into the receiver (23). Thereafter, the refrigerant flows into the outflow pipe (33) from the receiver (23), passes through the outflow check valve (34), and flows into the liquid side interconnecting pipe (16).

The refrigerant, which has flowed into the liquid side interconnecting pipe (16), is divided into two groups, one of which flows into the first indoor circuit (60) and the other of which flows into the second indoor circuit (65). In the indoor circuits (60, 65), the refrigerant, which has flowed thereinto, is depressurized by the indoor expansion valves (62, 67) and thereafter flows into the indoor heat exchangers (61, 66). In the indoor heat exchangers (61, 66), the refrigerant absorbs heat from indoor air and evaporates. In other words, in the indoor heat exchangers (61, 66), indoor air is cooled.

The refrigerant evaporated by the indoor heat exchanger (61) and the refrigerant evaporated by the indoor heat exchanger (66) flow into the gas side interconnecting pipe (17) and are merged there. The merged refrigerant flows into the outdoor circuit (20). Thereafter, the refrigerant passes through the four-way selector valve (21), flows through the suction pipe (43), and is drawn into the compressors (41, 42) of the compressor unit (40). Each of the compressors (41, 42) compresses the refrigerant drawn and discharges it. Such circulation of the refrigerant is carried out repeatedly in the refrigerant circuit (15).

Heating Operation

During the heating mode of operation, a heating operation, in which the indoor heat exchangers (61, 66) serve as condensers, is carried out. In the heating mode of operation, the four-way selector valve (21) is placed in the state indicated by broken lines of FIG. 1. The outdoor expansion valve (24) and the first and second indoor expansion valves (62, 67) are adjusted to predetermined valve travel values, respectively. The oil return solenoid valve (53) and the oil amount averaging solenoid valve (55) are placed in the open or closed state as required. The gas vent solenoid valve (36) is held constantly in the open state during the heating operation. These valve operations are carried out by the controller (90).

Figure 3:
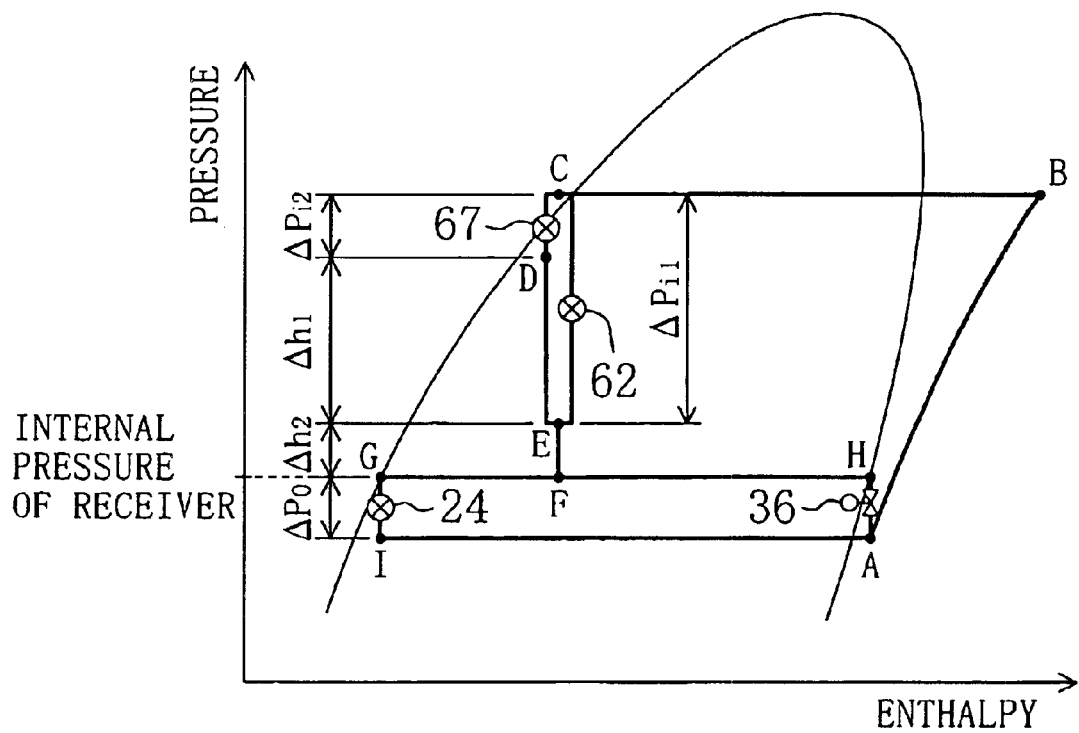
FIG. 3 is a Mollier diagram showing a refrigeration cycle in the heating operation in the airconditioner of the embodiment.
Figure 4:
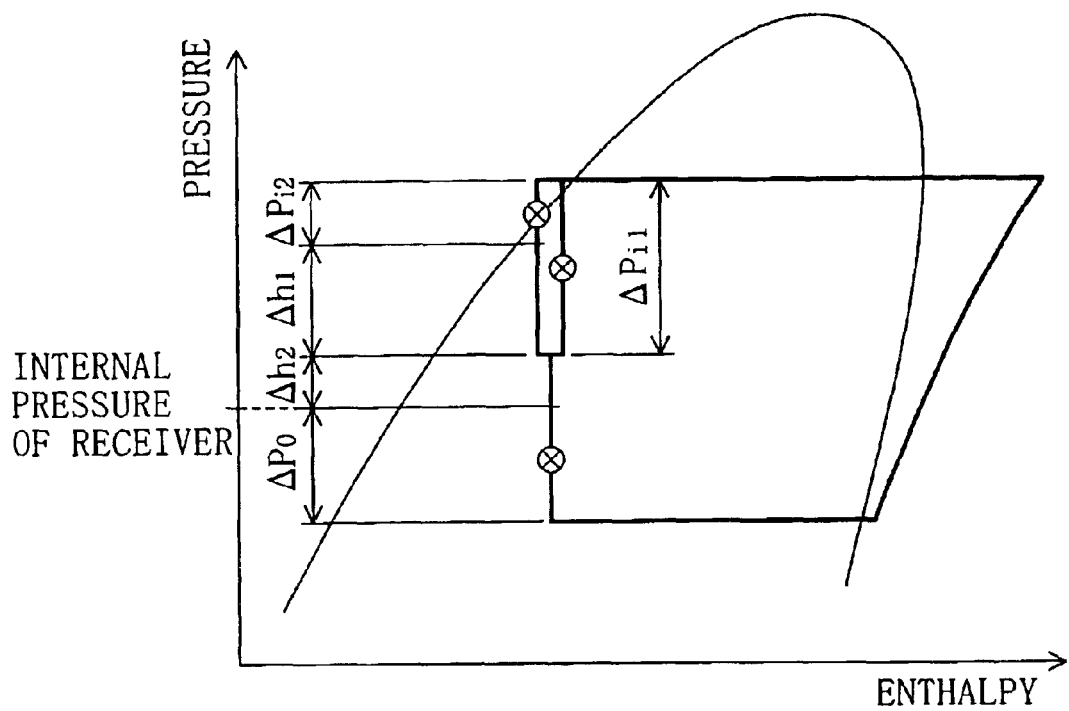
FIG. 4 is a Mollier diagram showing a refrigeration cycle in the heating operation in an airconditioner according to a prior art technique.

Here, operations in the heating operation will be described by making reference to FIG. 3. FIG. 3 is a Mollier diagram (i.e., a pressure-enthalpy diagram) showing a typical refrigeration cycle performed in the heating operation in the refrigerant circuit (15).

When the compressors (41, 42) of the compressor unit (40) are operated, the compressors (41, 42) draw in a refrigerant in the state of Point A state and compress the refrigerant. The compressors (41, 42) discharge the refrigerant compressed to the discharge pipe (44). The refrigerant in the state of Point B flowing through the discharge pipe (44) passes through the four-way selector valve (21), flows into the gas side interconnecting pipe (17), and is distributed to the indoor circuits (60, 65).

The refrigerant, which has flowed into the first indoor circuit (60) of the first indoor unit (12), liberates heat to indoor air in the first indoor heat exchanger (61) and condenses, thereby making a change in state from Point B to Point C. In the first indoor heat exchanger (61), indoor air is heated by a liberation of heat from the refrigerant. The refrigerant condensed by the first indoor heat exchanger (61) is depressurized by the first indoor expansion valve (62), thereby entering the state of Point E. In other words, there is a pressure difference, $\Delta P_{i1}$, between the inlet pressure and the outlet pressure of the first indoor expansion valve (62).

The refrigerant, which has flowed out of the first indoor circuit (60), flows through the liquid side interconnecting pipe (16) and flows into the outdoor circuit (20). Here, there is a difference of $H_2$ in installation height between the first indoor unit (12) and the outdoor unit (11) (see FIG. 2). Accordingly, the refrigerant, which has exited the first indoor circuit (60) and which is assuming the state of Point E, decreases in pressure by a head difference $\Delta h_2$ corresponding to the installation height difference $H_2$ by the time that it reaches the outdoor circuit (20), thereby entering the state of Point F.

The refrigerant, which has flowed into the second indoor circuit (65) of the second indoor unit (13), liberates heat to indoor air in the second indoor heat exchanger (66) and condenses, thereby making a change in state from the state of Point B to the state of Point C. In the second indoor heat exchanger (66), indoor air is heated by a liberation of heat from the refrigerant. The refrigerant condensed by the second indoor heat exchanger (66) is depressurized by the second indoor expansion valve (67), thereby entering the state of Point D. In other words, there is a pressure difference, $\Delta P_{i2}$, between the inlet pressure and the outlet pressure of the second indoor expansion valve (67).

The refrigerant, which has flowed out of the second indoor circuit (65), flows through the liquid side interconnecting pipe (16) toward the outdoor circuit (20). Here, there is a difference of $H_1$ in installation height between the second indoor unit (13) and the first indoor unit (12) (see FIG. 2). Accordingly, the refrigerant, which has exited the second indoor circuit (65) and which is assuming the state of Point D, decreases in pressure by a head difference of $\Delta h_1$ corresponding to the installation height difference $H_1$ by the time that it reaches the same height as the first indoor unit (12), thereby entering the state of Point E. Furthermore, as described above, there is a difference of $H_2$ in installation height between the first indoor unit (12) and the outdoor unit (11). Accordingly, the refrigerant, which has exited the second indoor circuit (65) and which is assuming a pressure-dropped state (i.e., the state of Point E), decreases in pressure by a head difference of $\Delta h_2$ corresponding to the installation height difference $H_2$ by the time that it reaches the outdoor circuit (20), thereby entering the state of Point F.

The refrigerant, which has entered the outdoor circuit (20) from each of the indoor circuits (60, 65) and which is assuming the state of Point F, flows through the second branch pipe (30b) of the inflow pipe (30), passes through the second inflow check valve (32), and flows into the receiver (23). The refrigerant flowing into the receiver (23) assumes a gas-liquid two-phase state. Liquid-phase refrigerant is held in a lower part of the receiver (23), while on the other hand gaseous-phase refrigerant is held in an upper part of the receiver (23). In other words, in the receiver (23) the refrigerant assuming the state of Point F is separated into a liquid-phase refrigerant assuming the state of Point G and a gaseous-phase refrigerant assuming the state of Point H.

The liquid refrigerant held in the receiver (23) and assuming the state of Point G passes through the outflow pipe (33) and flows toward the outdoor expansion valve (24). The refrigerant is depressurized by the outdoor expansion valve (24) and enters the state of Point I. The refrigerant assuming the state of Point I is delivered to the outdoor heat exchanger (22), absorbs heat from outdoor air, and evaporates. The refrigerant evaporated passes through the four-way selector valve (21) and flows into the suction pipe (43). On the other hand, the gaseous refrigerant held in the receiver (23) and assuming the state of Point H flows into the gas vent pipe (35). The refrigerant flowing through the gas vent pipe (35) is depressurized when passing through the gas vent solenoid valve (36) and thereafter flows into the suction pipe (43). In the suction pipe (43), the gaseous refrigerant from the outdoor heat exchanger (22) and the gaseous refrigerant from the gas vent pipe (35) flow into each other, whereby the merged refrigerant enters the state of Point A. The gaseous refrigerant assuming the state of Point A is drawn into the compressors (41, 42) of the compressor unit (40).

Effects of Embodiment

In the present embodiment, during the heating operation in the heating mode of operation, the controller (90) places the gas vent solenoid valve (36) in the open state. Accordingly, gaseous refrigerant held in the receiver (23) is drawn into the compressors (41, 42) and, as a result, the pressure of the receiver (23) is reduced. Consequently, it becomes possible to gain a sufficient pressure difference between the ends of the liquid side interconnecting pipe (16), thereby ensuring that refrigerant condensed by each of the first and second indoor heat exchangers (61, 66) is brought back to the receiver (23).

Such arrangement ensures that, even when there is a difference in installation height between the two indoor units (12, 13), refrigerant condensed in the lower situated, second indoor heat exchanger (66) disposed in the second indoor unit (13) is brought back to the receiver (23), thereby making it possible to secure a flow rate of refrigerant required in each of the first and second indoor heat exchangers (61, 66). As a result of this, in accordance with the present embodiment, it is possible to relax restrictions on the difference in installation height between the first and second indoor units (12, 13) at the time of installation of the multi type airconditioner (10), thereby improve the freedom of layout of the airconditioner (10).

The present embodiment further provides the following effects which will be described below.

Liquid refrigerant and gaseous refrigerant coexist in the inside of the receiver (23). If the gaseous refrigerant is pumped out from the receiver (23) to reduce the pressure of the receiver (23), this causes a part of the liquid refrigerant held in the receiver (23) to evaporate. This results in robbing heat from the remaining liquid refrigerant. Consequently, the specific enthalpy of the liquid refrigerant drops. Stated another way, the enthalpy of liquid refrigerant which is delivered to the outdoor heat exchanger (22) acting as an evaporator from the receiver (23) drops. Accordingly, it becomes possible to gain, by just that much, the enthalpy difference between the inlet and the outlet of the outdoor heat exchanger (22), whereby the refrigerant evaporation pressure in the outdoor heat exchanger (22) is increased while securing the amount of refrigerant heat absorption in the outdoor heat exchanger (22). Consequently, the compression ratio of the compressors (41, 42) is reduced without decreasing the amount of heat liberation of the refrigerant in the indoor heat exchangers (61, 66), and the power consumption of the compressors (41, 42) is cut down, so that the COP (coefficient of performance) of the airconditioner (10) is improved.

Modification Examples of Present Embodiment

In the present embodiment, the controller (90) controls the gas vent solenoid valve (36) in the heating mode of operation and the gas vent solenoid valve (36) is held constantly in the open state during the heating operation. Alternatively, it may be arranged such that, even during the heating operation, the gas vent solenoid valve (36) is placed in the open state only when predetermined conditions are met.

More specifically, it may be arranged such that the receiver (23) is depressurized by placing the gas vent solenoid valve (36) in the open state when the second indoor expansion valve (67) is fully opened during the heating operation in the heating mode of operation. In other words, when the second indoor expansion valve (67) is fully opened, it becomes impossible to gain any more pressure difference between the outflow side of the second indoor circuit (65) and the outdoor circuit (20). Consequently, the flow rate of refrigerant in the upper situated, first indoor circuit (60) increases while the flow rate of refrigerant in the lower situated, second indoor circuit (65) decreases. To cope with this, the receiver (23) is depressurized by placing the gas vent solenoid valve (36) in the open state, whereby the pressure difference between the outflow side of the second indoor circuit (65) and the outdoor circuit (20) is gained and the flow rate of refrigerant in the second indoor circuit (65) is secured.

The present invention may be embodied in various other forms without departing from the sprit of the present invention or the sprit of essential characteristics thereof. The foregoing embodiment is therefore illustrative only and not restrictive. The scope of the present invention is defined by the appended claims rather than by the specification description preceding them. All changes and modifications that fall within the equivalent scope of the appended claims are within the scope of the present invention.

What is claimed is:

1. A heat pump apparatus comprising a refrigerant circuit (15) in which a plurality of utilization side circuits (60, 65) having respective utilization side heat exchangers (61, 66) and utilization side expansion mechanisms (62, 67) are each connected in parallel to a heat source side circuit (20) having a compressor (41, 42), a heat source side expansion mechanism (24), and a receiver (23), wherein:

said heat pump apparatus performs at least a heating operation for allowing refrigerant, condensed by each of said utilization side heat exchangers (61, 66) in a refrigeration cycle in which refrigerant circulates in said refrigerant circuit (15), to flow into said receiver (23), said receiver (23) is provided upstream of said heat source side expansion mechanism (24) in the direction of the flow of refrigerant during heating operation, said heat pump apparatus further comprises:

a communicating passageway (35) for directing gaseous refrigerant in said receiver (23) to a suction side of said compressor (41, 42), a switching mechanism (36) for establishing and interrupting flow of gaseous refrigerant in the communicating passageway (35), and controlling means (90) for controlling said switching mechanism (36) so that gaseous refrigerant within said receiver (23) is sucked into said compressor (41, 42) to reduce the internal pressure of said receiver (23) during the heating operations, said receiver (23) of which internal pressure is reduced sucks refrigerant from said respective utilization side heat exchangers (61, 66) during the heating operation.

2. The heat pump apparatus of claim 1, wherein:

said heat source side circuit (20) is connected, through interconnecting lines (16, 17), to said utilization side circuits (60, 65) disposed lower than said heat source side circuit (20), and at least one of said utilization side circuits (60, 65) is disposed at a different height from that of the other utilization side circuit (60).

3. The heat pump apparatus of claim 1, wherein said controlling means (90) controls said switching mechanism (36) so that gaseous refrigerant constantly flows through said communicating passageway (35) during the heating operation.

4. The heat pump apparatus of claim 2, wherein said controlling means (90) controls said switching mechanism (36) so that gaseous refrigerant constantly flows through said communicating passageway (35) during the heating operation.

* * * * *

UNITED STATES PATENT AND TRADEMARK OFFICE
CERTIFICATE OF CORRECTION

PATENT NO. : 6,826,924 B2 Page 1 of 1
DATED : December 7, 2004
INVENTOR(S) : Junichi Shimoda et al.

It is certified that error appears in the above-identified patent and that said Letters Patent is hereby corrected as shown below:

Column 14,
Line 26, "operations" should read -- operation --.

Signed and Sealed this

Twenty-seventh Day of September, 2005

JON W. DUDAS
*Director of the United States Patent and Trademark Office*